US 6,685,128 B2

(12) United States Patent
Healy

(10) Patent No.: US 6,685,128 B2
(45) Date of Patent: Feb. 3, 2004

(54) SYSTEMS AND METHODS OF WINDING OPTICAL FIBER

(75) Inventor: Alfred W. Healy, Bedford, MA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 288 days.

(21) Appl. No.: 09/963,893

(22) Filed: Sep. 26, 2001

(65) Prior Publication Data

US 2003/0230664 A1 Dec. 18, 2003

Related U.S. Application Data

(60) Provisional application No. 60/291,164, filed on May 15, 2001.

(51) Int. Cl.⁷ ............................................... B65H 81/06
(52) U.S. Cl. ..................... 242/445; 356/465; 385/135
(58) Field of Search ........................................ 242/445

(56) References Cited

U.S. PATENT DOCUMENTS

| | | | |
|---|---|---|---|
| 3,586,563 A | | 6/1971 | Fukkami et al. |
| 5,052,632 A | | 10/1991 | Stokes, Jr. |
| 5,109,450 A | * | 4/1992 | Johann et al. ............... 385/52 |
| 5,406,370 A | * | 4/1995 | Huang et al. ............... 356/465 |
| 5,841,932 A | * | 11/1998 | Page et al. ................. 385/134 |
| 5,917,983 A | * | 6/1999 | Page et al. ................. 385/134 |
| 5,973,783 A | | 10/1999 | Goldner et al. |
| 6,522,826 B2 | * | 2/2003 | Gregory ..................... 385/135 |

FOREIGN PATENT DOCUMENTS

EP 0913667A1 5/1999

* cited by examiner

Primary Examiner—Emmanuel Marcelo

(57) ABSTRACT

A method and system for winding optical fiber. In an embodiment, the method and system can be used to tune a fiber optic gyroscope (FOG) for a desired eigenfrequency and/or scale factor. A FOG assembly can include an inner coil that can have a normal and a reverse breakout point, a normal and a reverse lead emanating therefrom, and a normal and a reverse splice that can be connected at normal and reverse connection points. The coil can be wrapped to include a reversal where the reverse section of fiber changes direction in which it is wrapped on a spool. The fiber length can be adjusted based on the desired eigenfrequency. Furthermore, based on a scale factor, a forward (plus) and reverse (minus) fiber length can be computed and at least one of several lengths that can be defined by the ends of the normal and reverse splices, the normal and reverse connection points, the normal and reverse leads, the normal and reverse breakout points, and the reversal, can be adjusted to further attain the scale factor and/or eigenfrequency.

39 Claims, 3 Drawing Sheets

SYSTEMS AND METHODS OF WINDING OPTICAL FIBER

This application claims priority to U.S. Ser. No. 60/291,164 entitled "SYSTEMS AND METHODS OF TUNING A FIBER OPTIC COIL FOR A FIBER OPTIC GYROSCOPE", filed on May 15, 2001, and naming Dr. Alfred W. Healy as inventor, the contents of which are herein incorporated by reference in their entirety.

BACKGROUND (1) Field

The disclosed methods and systems relate generally to winding optical fiber, and in particular to systems and methods to wind the optical fiber based on an eigenfrequency and/or scale factor.

(2) Description of Relevant Art

Fiber optic gyroscopes (FOGs) have evolved in recent decades from laboratory demonstration to practical use. FOGs can be used in many applications including navigational systems and stabilization platforms. The FOG operational principle for sensing inertial rotation is optical rather than mechanical. FOGs can use the well-known Sagnac effect to sense the relative increase in optical pathlength when a coil of optical fiber is rotated about its axis. Accordingly, consider a beam of light that is split into two beams that are directed in opposite directions around a loop and to a detector. In theory, the two beams will travel equal distances and arrive at the detector at the same time and in-phase. The Sagnac effect indicates that if the entire device or loop is rotating, the beam traveling in the direction of rotation will travel further than the beam traveling opposite to the rotation, and hence the beams will arrive at the detector at different times and out of phase, thereby producing measurable optical fringes. Accordingly, the length of the optical path and the diameter of the optical winding can determine the FOG accuracy.

Generally, FOGs can be constructed by winding a fiber optic cable around a generally circular spool with a number of turns holding the fiber optic cable in place. As indicated previously, light can be broadcast into both ends of the fiber optic cable and a detector or other sensor can record the light exiting the cable ends. Interference patterns between the exiting light waves can indicate changes in rotational motion of the FOG in the plane through the toroid formed by the fiber optic cable.

FOGs can be manufactured based on a particular frequency or propagation time, otherwise known as an eigenfrequency, that is based on the coil and other fiber parameters. Accordingly, the eigenfrequency can be understood to be inversely proportional to the propagation time through the fiber optic coil. Because the eigenfrequency, and also propagation time, can be effected by variations in fiber core diameter, coil length, and geometry, it can be difficult to wind a FOG coil for a specific and/or predetermined eigenfrequency (i.e., propagation time). Although the operational frequency of a FOG can approximately correspond to coil length, this relationship is not exact, and FOG winding techniques that contend with merely this single relationship can inspire FOG manufacturing methodologies that provide inconsistent and inaccurate results with respect to a desired eigenfrequency.

SUMMARY

The disclosed methods and systems include winding optical fiber to an eigenfrequency and/or a scale factor. In one embodiment, the methods and systems can be used to tune a fiber optic gyroscope (FOG) to an eigenfrequency. In the FOG embodiment, a fiber optic coil assembly can include a normal end and a reverse end, a normal breakout point and a reverse breakout point, a normal lead and a reverse lead provided from the normal and reverse breakout points toward the normal and reverse fiber ends, and a normal and a reverse connection point for connecting a normal and a reverse splice to at least one of normal and reverse leads and normal and reverse ends. The normal and reverse splices can be secured by, for example, epoxy, to form a zipped section. The fiber optic coil can be wrapped between the normal breakout point and the reverse breakout point, around a spool, and such section can be known as an inner coil. The fiber optic coil from the normal and reverse breakout points, to the normal and reverse ends of the zipped section, can also be wrapped around the spool, to cause a reversal of wrapping direction of one of the reverse splice, the reverse connection point, and/or the reverse lead.

The normal and reverse splices and/or leads can be adjusted to provide a length that is based on the desired eigenfrequency. The length can be increased or decreased. Furthermore, a set of lengths can be established. For example, a first length can be provided between the reversal and the reverse breakout point, a second length between the reversal and the reverse connection point, a third length between the normal connection point and the normal breakout point, a fourth length between the normal breakout point and the reverse breakout point ("inner coil"), a fifth length between the reverse end and the reverse connection point, and a sixth length between the normal end and the normal connection point. The lengths can be further categorized as one of "plus" or "forward" lengths, or "minus" or "reverse" lengths, based on the direction of winding around the spool. In one embodiment, the first, third, and sixth lengths can be "plus" lengths (all same direction), while the second and fifth lengths can be "minus" lengths (all same direction, but opposite of the plus lengths). In some embodiments, the fourth length cannot be adjusted. Accordingly, based on an excess length, a measured eigenfrequency, the desired eigenfrequency, the fourth length, an outside diameter of the inner coil, and an effective mean diameter of the inner coil, a desired plus and minus length can be computed. One or more of the lengths contributing to the plus and minus lengths, namely lengths one, three, and six, and lengths two and five, respectively, can be adjusted to achieve the desired plus and minus lengths. Furthermore, the reversal can be adjusted.

Other objects and advantages will become apparent hereinafter in view of the specification and drawings.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore features, components, modules, and or aspects of the illustrations can be otherwise combined, separated, interchanged, and/or rearranged without departing from the systems or methods.

The disclosed systems and methods can be used to wind optical fiber for a given eigenfrequency and/or scale factor. Although the methods and systems can be used for any application for which optical fiber can be wound for a given eigenfrequency and/or scale factor, the illustrated embodiments provide examples for tuning a fiber optic gyroscope (FOG).

Generally, FOGs can be used in applications that require the FOG to work at a preselected and/or specified frequency. High precision FOGs attempt to provide and maintain operation at a given frequency known as an eigenfrequency. The eigenfrequency can be understood to be inversely proportional to the propagation time of light through the FOG coil. Because the time of propagation, and hence the eigenfrequency, can be affected by the coil length, coil diameter, and other factors, it can be difficult to manufacture a FOG for a predetermined or otherwise specified eigenfrequency. The disclosed systems and methods provide systems and methods to tune a FOG to a preselected eigenfrequency.

Figure 1A:
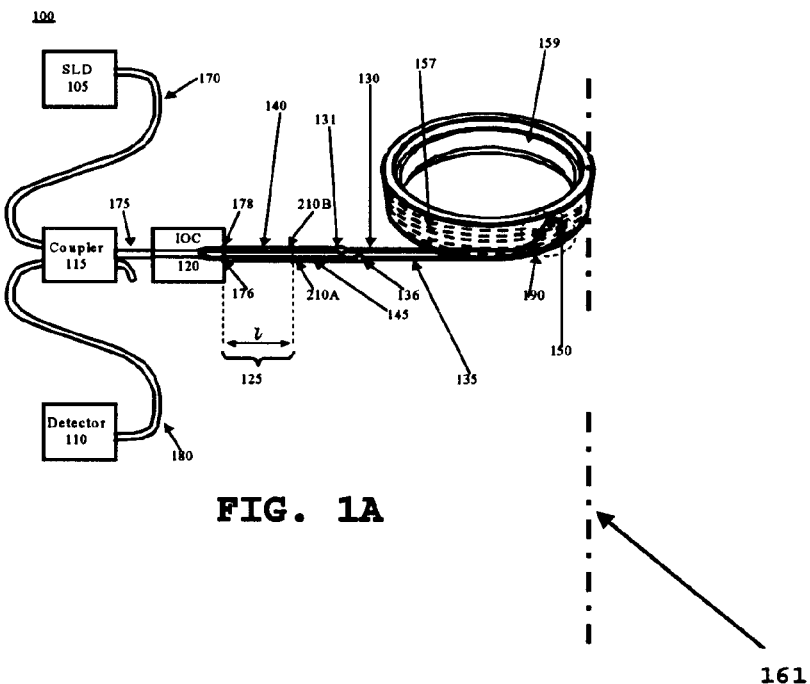
FIG. 1A shows a system with a partially wrapped fiber optic gyroscope (FOG)

FIG. 1A illustrates one embodiment of a system 100 employing a FOG. The illustrated FOG system 100 includes a light source 105, an optical fiber 170 connecting the light source 105 to a coupler 115, and an optical fiber 180 connecting a light detector 110 with the coupler 115. Another optical fiber 175 connects the coupler 115 to an integrated optical circuit (IOC) 120. Those with ordinary skill in the art will recognize that the IOC 120 can include, for example, a phase shifter.

In one embodiment of the FIG. 1A system 100, the light source 105 can be a super luminescent diode (SLD) such as those manufactured commercially under the name Superlum model 361. The coupler 115 can be an optical coupler, including for example, an optical coupler available from Thomas and Betts as universal part code 788 02513625PM or catalog part WX-502-351-00E1-001, and available from Wave Optics of Mountain View, Calif. Additionally, the IOC 120 can be an integrated optical circuit constructed of proton or ion implanted lithium niobate (LiNbO$_3$) or other exotic dielectric substrate, and can have features that include modulating a light waveform and splitting a light waveform. In the FIG. 1A embodiment 100, the IOC 120 can be connected to the coupler 115 using a first, single channel interface, while the IOC 120 can also maintain a distinct second, dual channel interface 176, 178.

The illustrated IOC 120 dual channel interface 178, 176 can be connected to a first end of two fiber optic segments 145, 140, respectively. The two fiber optic segments 145, 140 can be further connected, at a second end, via connection points 131, 136, to a first lead 130 and a second lead 135, respectively, from a fiber optic coil 155. The two fiber optic segments 145, 140 can be referred to herein as first and second fiber splices 145, 140. In some embodiments, the fiber splices 145, 140 can be referred to as normal and reverse fiber splices, where the designation of normal and reverse can be arbitrarily chosen as provided herein. Accordingly, the illustrated coil 155 (referenced in FIG. 1C) can be understood to include an inner coil 157 that can be a number of fiber optic turns that can be, in some embodiments, epoxied or otherwise fixed, although those with ordinary skill in the art will recognize that such embodiment is not limiting of the disclosed methods and systems.

In some embodiments, the inner coil 157 can be understood to include prewound coil that can have a fixed number of turns and extensions at either end, where the extensions can be understood herein as a first and second lead 130, 135. The points at which the inner or prewound coil 157 end, can be referred to herein respectively as breakout points 210, 215 (also see FIG. 1B). Similarly, it can be understood that the fiber between the breakout points 210, 215 can be referred to as the inner coil 157. Additionally, the fiber between the breakout points 210, 215 and the connection points 131, 136 can be understood to be the first and second leads 130, 135.

As will be provided herein, the first and second leads 130, 135 extending from the inner coil 157, and hence extending from or beyond the breakout points 210, 215 in a direction traveling away from the inner coil 157, can be further wound on or over the inner or prewound coil 157 in a direction that is consistent with, or contrary to, the direction of the fibers as fixed or otherwise positioned on the inner coil 157.

Accordingly, as provided herein, the terms "normal" and "reverse" can be understood to indicate the direction of light as traveled along the inner coil 157 around a spool 159 or other device or structure on which the inner coil 157 can be wrapped, and as the light is provided to the inner coil 157 from the respective splice 145, 140. The designation of normal and reverse light travel is arbitrary. The respective splices 145, 140 can thus be referred to as normal and reverse splices based on the desired configuration.

For discussion purposes herein, the term "reverse" can be understood to modify the terms splice 145, 140, lead 130, 135 breakout point 210, 215, and connection point 131, 136 to indicate or otherwise specify the fiber (between a breakout point and the IOC 120) that includes a reversal 150 as will be described further herein. Furthermore, the term "normal" can be understood to modify terms specifying the fiber (between the other breakout point and the IOC 120) that does not include the reversal 150.

The illustrated normal and reverse splices 145, 140 can include a section that can be referred to herein as a zipped section 125. In the illustrated zipped section 125, the two fiber splices can be secured using, for example, epoxy, to provide mechanical strength and physically secure the two splices 145, 140 or a portion thereof. By physically securing the two splices 145, 140 in this manner, the differences in optical paths through the respective zipped portions can be understood to be negligible, as physical or other effects affecting one splice (normal or reverse) in the zipped section 125, can be understood to effect the other splice in the zipped section 125. As indicated in FIG. 1A, the zipped section 125 can extend from the IOC 120 to points shown as 210A and 210B.

For the purposes of the discussion herein, the normal and reverse splices 145, 140 (i.e., from connection points 131, 136 to the IOC 120), including the zipped section 125, and in some cases, in combination with the IOC 120, can be referred to as pigtails.

Because the pigtails 145, 140 and first and second leads 130, 135 can be wound around the inner coil 157, one of ordinary skill in the art will recognize that, for the illustrated embodiment, the two fibers that include the two splices 145, 140 and first and second lead sections 130, 135 can be wrapped together in the same direction around the inner coil 157. This can be contrasted to the single coil wrapping of the inner coil 157. Accordingly, using a perspective from the breakout points 210, 215 and looking towards the IOC 120, the first and second leads 130, 135 (and/or pigtail sections 145, 140) can be understood to be wound, respective to each other, in the same direction around the inner coil 157. Alternately, using a perspective from the breakout points 210, 215 and looking towards the inner coil 157, the two fibers can be viewed, respective to each other, to be wrapped in different directions within the windings of the inner coil 157. More particularly, at or near one of the breakpoints 210, 215, there can be a reversal in direction of one of the first and second leads 130, 135 as it transitions from the single wrap of the inner coil 157 to the dual wrap of the first/second lead 130, 135 section and pigtail section 145, 140. This reversal section 150 can be known herein as the reversal.

Figure 1B:
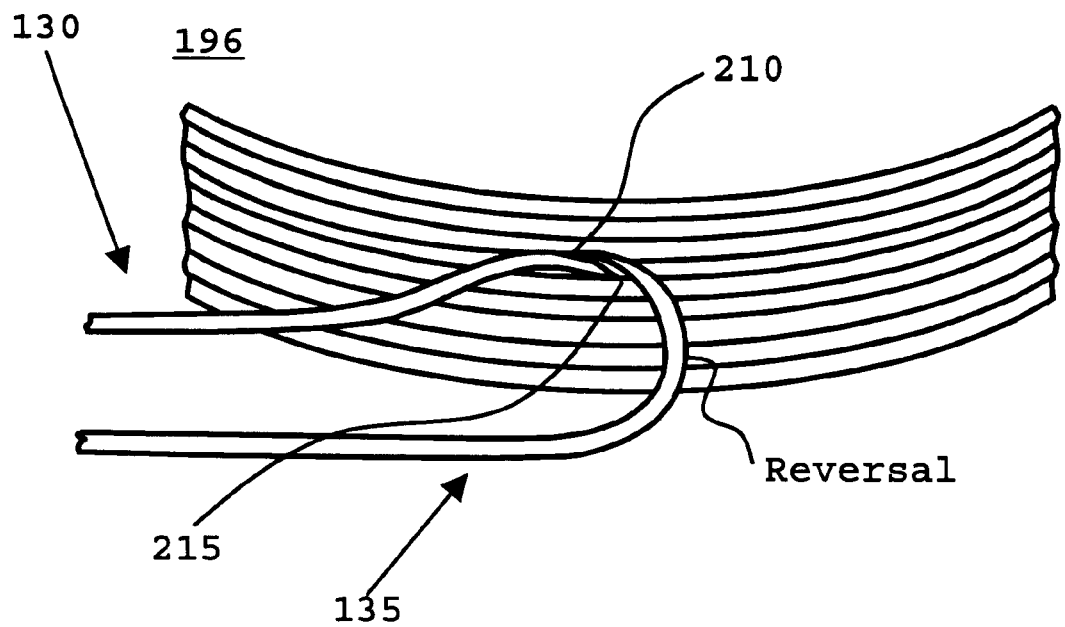
FIG. 1B displays a reversal loop for a FOG.

FIG. 1B illustrates one embodiment for winding a coil and generating an inner coil 157. In the FIG. 1B embodiment, there can be a magnified view or a portion of coil 155 as provided in FIG. 1A. As indicated, FIG. 1B specifies the breakout points 210, 215 for the respective first and second leads 130, 135, and the reversal section 150 as provided previously herein, where one of the leads changes direction due to the transition from a single wrap to the doubly wrapped section as previously provided herein. As also previously provided herein, that one lead/connection point/pigtail, etc. that changes direction and includes the reversal 150 can be referred to herein, arbitrarily, as the reverse lead, while the remaining lead can hence be referred to herein, by default, as the normal lead.

Those with ordinary skill in the art will recognize that if the fiber of the inner coil 157 is wound by fixing one end and winding the fiber in a first direction, the fiber coil can be unwound by rotations in the opposite direction. Accordingly, the embodiment of FIG. 1B presents an alternative winding technique where a loop of fiber can be provided such that the respective ends of the loop correspond approximately to desired breakout points 210, 215. These two ends can be initially positioned on a spool 159 and the loop can be repeatedly placed over the spool 159 to mitigate the problems of the single winding technique previously presented herein. Accordingly, with a winding technique as provided herein and illustrated by FIG. 1B, the first and second leads 130, 135 can be secured by the subsequently positioned inner coil 157 windings. As FIG. 1B indicates, the inner coil 157 can be wound on top of the first and second leads 130, 135 such that the respective breakout points 210, 215 can be understood or visually represented as emanating from the inner coil 157. Those of ordinary skill in the art will recognize that the methods and systems provided herein are not limited to the winding technique, and other winding techniques can be used.

FIG. 1B also illustrates the reversal 150, such that although two paths of light enter from the IOC, through the pigtails 145, 140 and first and second leads 130, 135 while in the same direction rotating around the spool 159, upon reaching the reversal 150, one of the optical (light) paths (i.e., reverse lead) changes rotational directional around the spool 159 as it travels along the inner coil 157. As indicated previously herein, this change of direction can affect the FOG eigenfrequency, measurements thereof, and other FOG measurements.

In some embodiments, the first and second leads 130, 135 can be purposefully cropped or otherwise shortened beyond the desired length as predicted/predetermined based on an eigenfrequency for the FOG. Accordingly, the respective normal and reverse splices 145, 140 can compensate for length deficiencies that can be provided in the first and second leads 130, 135.

Figure 1C:
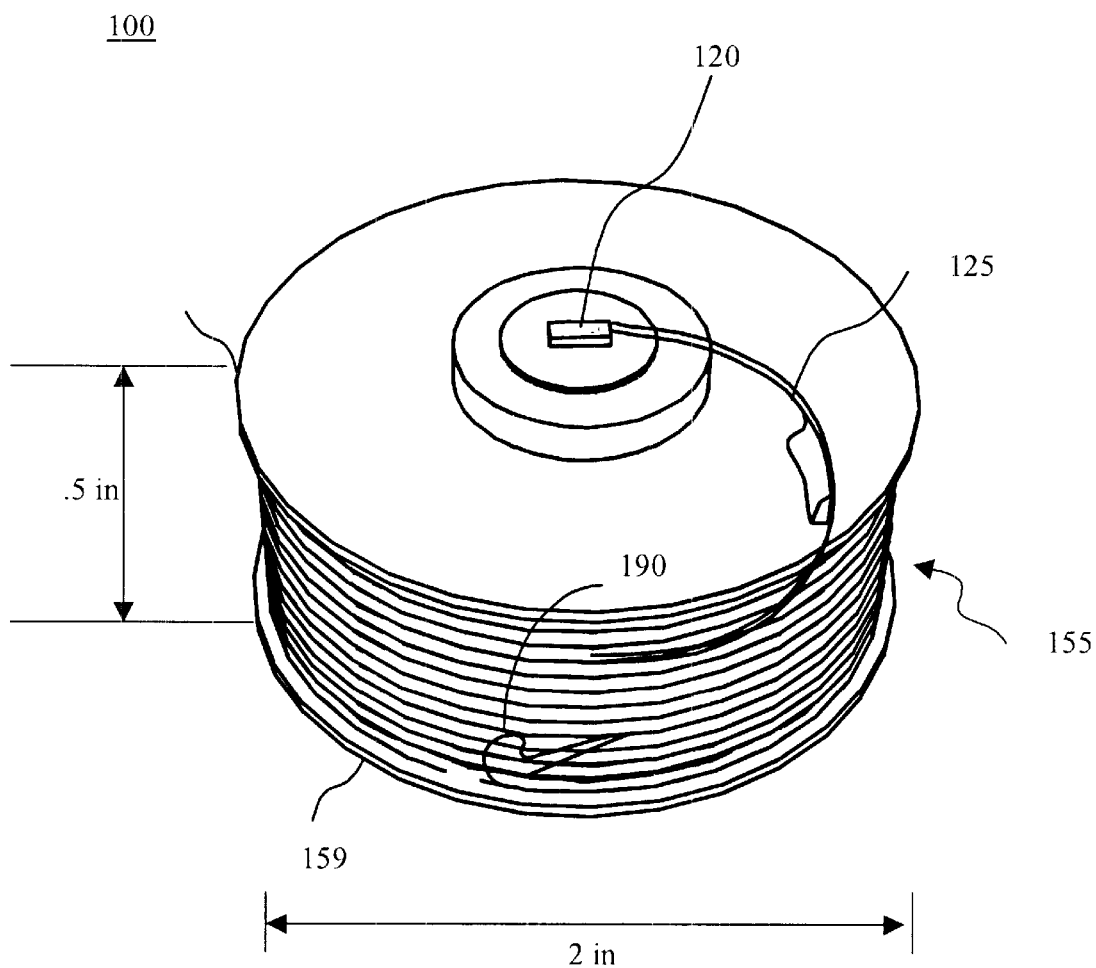
FIG. 1C is a wrapped FOG.

Referring to FIG. 1C, there is a diagram that indicates an inner winding 157 wrapped on a spool 159, with the pigtail section also wrapped on the spool 159.

Referring back to FIG. 1A, those with ordinary skill in the art will recognize that the light source 105 can emit a light wave at a frequency, known as the eigenfrequency, at which the FOG is to operate. The light wave can propagate through the fiber 170 to the coupler 115. The coupler 115 can transfer the light wave to the IOC 120 that splits the light wave such that approximately fifty-percent of the light wave passes to the normal and reverse splices 145, 140 respectively. In some embodiments, the IOC 120 can shift the respective light waves. For example, in one embodiment, one light wave can be phase-shifted by pi/2 radians, while the other light wave can be phase shifted by (-pi/2) radians, before being transferred to the normal and reverse splices 145, 140.

In one embodiment where the normal splice can be indicated by 145, a light wave can travel through the normal splice 145, through connection 131, to the first lead (otherwise referred to herein as the normal lead) 130, and hence to the inner coil 157.

After traversing the inner coil 157, the light wave leaves the inner coil 157, reverses rotational directional around the spool 159 upon traversing the reversal 150 as part of the second lead (otherwise referred to as the reverse lead) 135, traverses a connection point 136, reverse splice 140, and is received by the IOC 120. Similarly, and in some embodiments, simultaneously, a light wave can propagate from the IOC 120 through reverse splice 140, connection point 136, and reverse 135 having one rotational direction around the spool 159. Such light wave thereafter traverses the reversal 150 and accordingly changes its rotational direction around the spool 159 before entering the inner coil 157. This light wave travels through the inner coil 157, and thereafter through normal lead 130, connection point 131, normal splice 145, and thereafter to the IOC 120. Accordingly, the light waves traveling from IOC 120 to the inner spool along one splice 145, 140, return to the IOC 120 via the other splice 145, 140.

The IOC 120 can recombine two received light waves, and direct the recombined light wave through fiber 175 to the coupler 115. In some embodiments, the IOC 120 can further phase-shift the received light waves. The coupler 115 can direct approximately half of the light from the IOC 120 to the detector 110 that can determine, based on the received light patterns, the relative rotation of the coil assembly about the axis 161. Those with ordinary skill in the art will recognize that the detector output can be input to other circuitry or systems that can include, for example, a signal processing system or unit.

As indicated herein, the FOG is associated with an eigenfrequency. Additionally, although a desired eigenfrequency value can be provided by a detector 110 or signal processing system, in many instances, the eigenfrequency determination is performed post-construction. It is therefore desirable to provide a coil 155 and pigtail assembly combination 145, 140 that can be modified or adjusted to achieve a desired eigenfrequency.

Several parameters shall now be described with relation to the terms described herein and with reference to FIGS. 1A, 1B, and 1C. A fiber length $L_1$ can be understood to be a fiber length between a reverse breakout point 215 (on the reverse lead) and the reversal 150. A fiber length $L_2$ can be understood to be a fiber length between the reversal 150 and the reverse connection point 136. A fiber length $L_3$ can be understood to be a fiber length between the normal connection point 131 the normal breakout point 210. A fiber length $L_4$ can be understood to be a fiber length between the normal breakout point 210 and the reverse breakout point 215, such fiber length otherwise defined herein to be the inner coil 157. A fiber length $L_5$ can be understood to be a fiber length between the reverse channel 176 of the IOC dual-channel interface (i.e., end of the reverse fiber that interfaces to the IOC 120) and the reverse connection point 136, such fiber length otherwise referred to herein as the reverse splice 140. A fiber length $L_6$ can be understood to be a fiber length between the normal channel 178 of the IOC dual channel interface (i.e., end of the normal fiber that interfaces to the IOC 120) and the normal connection point 131, such fiber length also referred to herein as the normal splice 145. It can be recognized that fiber lengths $L_1$–$L_6$ relate to magnitude and not direction, and therefore a polarity sign is not associated with the lengths. The relationships of the fiber lengths are provided in Table 1.

TABLE 1

List of lengths

| Length | Beginning Point | Ending Point |
| --- | --- | --- |
| $L_1$ | Breakout point 215 | Reversal loop 150 |
| $L_2$ | Reversal loop 150 | Connection point 136 |
| $L_3$ | Connection point 131 | Breakout point 210 |
| $L_4$ | Breakout point 210 | Breakout point 215 |
| $L_5$ | IOC end 176 | Connection point 136 |
| $L_6$ | IOC end 178 | Connection point 131 |

For discussion purposes, the length of the optical pathway from one of the dual channels (176, 178) of the IOC 120, to the other of the dual channels (176, 178) of the IOC 120, including therefore the inner coil 157, normal and reverse splices 145, 140, and normal and reverse leads 130, 135, can be referred to herein as the total length, and represented as $L_{Total}$. Although length can refer to magnitude, $L_{Total}$ can be represented as a vector quantity having a magnitude and a direction. Those with ordinary skill in the art will recognize that direction in computing optical length and/or $L_{Total}$ can be mathematically significant in considering the different rotational directions of the windings around the spool 159; and, for the illustrated systems of FIGS. 1A–1C, direction can be considered due to the reversal 150.

The eigenfrequency of a FOG can be represented notationally as $F_e$, and those with ordinary skill in the art will recognize that the eigenfrequency can also be referred to as the proper frequency, represented notationally as $F_p$. Accordingly, using the notation provided herein, the eigenfrequency can be computed according to Equation (1):

$$F_e = \sum_{n=1}^{6} \frac{K}{L_n} = \frac{K}{L_{Total}} \tag{1}$$

In equation (1), K represents a constant based on the speed of light in a specified optical fiber, and a value for K for some fibers can be, for example, on the order of $2.0 \times 10^8$ meters per second.

As indicated previously herein, there can be embodiments where signal processing systems, a detector 110, or other components or requirements can impose an eigenfrequency requirement. For such embodiments where there can be a preselected, designated, or otherwise specified eigenfrequency, such known eigenfrequency value can be referred to herein as a target eigenfrequency, and can be represented notationally as $F_{Tgt}$. Accordingly, using Equation (1), the target eigenfrequency can be represented based on a target total length, represented notationally as $L_{Tgt}$, and such relationship can be represented by Equation (2):

$$F_{Tgt} = \frac{K}{L_{Tgt}} \tag{2}$$

From Equation (2), it can be recognized that the target eigenfrequency can be achieved or otherwise attained by altering $L_{Tgt}$, the target total length. Similarly, those with ordinary skill in the art will recognize that $L_{Tgt}$ is a sum of component lengths $L_1$–$L_6$, however, some of the component lengths may not be alterable. In particular, $L_4$ may be unalterable because the inner coil 157, in some embodiments, can be manufactured or otherwise provided to approximate dimensions and fixed using epoxy, etc., and alteration can require disassembly that can be inefficient and/or undesirable. Accordingly, the alterable lengths can include $L_1$, $L_2$, $L_3$, $L_5$, and $L_6$, and those with ordinary skill in the art will recognize that the various lengths as defined herein, are interrelated, and hence alteration of one length can cause modifications of other lengths.

In one embodiment, excess fiber can be provided on the pigtail, while fiber on the coil 155 can be reduced. In this embodiment, the combination of pigtails (145, 140) and coil 155 can provide the desired length, while the extra length in the pigtail section allows for length adjustment through fiber length reduction in the pigtail, the leads 130, 135, and/or fiber surrounding or including the connection points 131, 136, to achieve a total length that approximates or otherwise satisfies the requirements for a target length.

Those with ordinary skill in the art will recognize that a FOG also includes a scale factor that indicates the FOG sensitivity to the FOG rotation. A higher scale factor can indicate increased sensitivity, while a lower scale factor can indicate decreased sensitivity. Accordingly, a FOG with a high scale factor can detect smaller motions than a FOG with a lower scale factor.

The FOG scale factor can be understood as the phase shift of the two counter-rotating light beams, divided by the rotational rate of the FOG. Equation (3) mathematically expresses the scale factor, $S_f$:

$$S_f = \left[\frac{2\pi}{\lambda C}\right] \int_0^{L_{Total}} \vec{Z} \cdot (D(l) \times dl) \tag{3}$$

In Equation (3), $L_{Total}$ is the combined length of all fiber portions, D(1) is the diameter of an incremental length of the fiber coil, Z is a unit vector in the axial direction of the coil, $\lambda$ is the wavelength of the light from light source 105, and C is the speed of light in a vacuum.

As in the case of an eigenfrequency, a scale factor can be required to have a specific value that can be prespecified, and can be selected to maximize the quality of a FOG. Accordingly, Equation (3) can be simplified and expressed as Equation (4):

$$L \cdot D = \frac{\lambda C}{2\pi} S_f \tag{4}$$

In Equation (4), L is the effective optical (vector) length of the fiber and L has a positive value for one direction of the fiber winding known as a forward direction, and a negative value for the other direction of the fiber winding, referred to herein as the reverse direction. It can be understood in some embodiments that the forward direction can be associated with addition, while windings in the reverse direction can be associated with subtraction.

Referring again to Equation (4), D is the mean diameter of the fiber in the coil assembly and can be expressed as a quotient having as numerator, a difference between the total fiber in the coil assembly and the fiber in the zipped portions, and as a denominator, a product of a number of turns on the coil and the constant known as pi and commonly represented as Π. For a specified scale factor, the side of Equation (4) to the right of the equivalence is a constant, and the side of Equation (4) to the left of the equivalence can be understood to present a product between a desired mean diameter, represented as $D_{Tgt}$, and a desired total length, $L_{Tgt}$. Using the directionality of the component lengths ($L_1$–$L_6$) and neglecting the effects of the fiber in the reversal 150, the left side of Equation (4) can be rewritten as:

$$D_{Tgt} \cdot L_{Tgt} = D_{Out} \cdot (L_1 + L_3 + L_6 - L_2 - L_5) + d \cdot L_4 \quad (5)$$

In Equation (5), $D_{out}$ is the outside diameter of the entirety of the inner coil windings, while d can be based on the inner coil geometry and the manufacturer's tolerances, and represents the effective mean diameter of an incremental portion of the fiber that composes the inner coil 157. Those with ordinary skill in the art will recognize that these tolerances can be provided in a range and can be specified by the particular application of the FOG.

Equation (5) can be re-written by grouping alterable forward and reverse direction components, as follows:

$$D_{Tgt} L_{Tgt} = D_{out} (L_{Plus} - L_{Minus}) + d \cdot L_4$$

where $$L_{Plus} = L_1 + L_3 + L_6$$

$$L_{Minus} = L_2 + L_5 \quad (6)$$

Accordingly, $L_{Plus}$ is a sum of lengths in the forward direction, while $L_{Minus}$ is a sum of length is the reverse direction. The provision of $L_{Plus}$ and $L_{Minus}$ allows the alteration of the FOG sensitivity by altering the appropriate coil portion lengths as desired.

Returning to Equation (1), a measured eigenfrequency, $F_{measured}$ can be expressed as a function of $L_{Total}$, where $L_{Total}$ can be further expressed as a function of the target length, $L_{Tgt}$ and excess length, $L_{excess}$:

$$F_{measured} = \frac{K}{L_{Total}} \quad (7, 8)$$

$$L_{Total} = L_{Tgt} + L_{excess}$$

By rewriting Equation (8) in terms of $L_{excess}$, and substituting into the re-written Equation (8), expressions for K and $L_{Tgt}$ as derived from Equations (7) and (2), respectively, Equation (8) can be re-written as:

$$L_{excess} = L_{Total}\left(1 - \frac{F_{measured}}{F_{Tgt}}\right) \quad (9)$$

Equation (9) can be further rewritten to incorporate the $L_{plus}$ and $L_{Minus}$ notation from equation (6), and simplified as an expression in terms of $L_{Plus}$ and $L_{Minus}$:

$$L_{excess} = (L_{Plus} + L_{Minus} + L_4)\left(1 - \frac{F_{measured}}{F_{Tgt}}\right) \quad (10, 11)$$

$$L_{Plus} + L_{Minus} = \left[\frac{L_{excess}}{1 - \frac{F_{measured}}{F_{Tgt}}}\right] - L_4$$

Re-writing Equation (8) in terms of $L_{Tgt}$ and substituting into Equation (6) yields Equation (12), while further expressing Equation (12) based on the difference between $L_{Plus}$ and $L_{Minus}$ yields Equation (13), as follows:

$$D_{Tgt} \cdot (L_{Total} - L_{Excess}) = D_{out} \cdot (L_{Plus} - L_{Minus}) + d \cdot L_4 \quad (12, 13)$$

$$L_{Plus} - L_{Minus} = \frac{D_{Tgt} \cdot (L_{Total} - L_{Excess}) - d \cdot L_4}{D_{out}}$$

Equations (11) and (13) can be simultaneously solved to produce:

$$L_{Plus} = \frac{\left(\frac{L_{excess}}{1 - \frac{F_{measured}}{F_{Tgt}}}\right) - L_4 + \frac{[D_{Tgt} \cdot L_{Tgt} - d \cdot L_4]}{D_{Tgt}}}{2} \quad (14, 15)$$

$$L_{Minus} = \frac{\left(\frac{L_{excess}}{1 - \frac{F_{measured}}{F_{Tgt}}}\right) - L_4 - \frac{[D_{Tgt} \cdot L_{Tgt} - d \cdot L_4]}{D_{Tgt}}}{2}$$

Based on Equations (14) and (15), a FOG can be constructed by determining values for $L_{Plus}$ and $L_{Minus}$ and modifying a combination of length variables in $L_{Plus}$ and/or a combination of length variables in $L_{Minus}$, along with the diameter D, to achieve a specified or desired scale factor and/or eigenfrequency.

Figure 2:
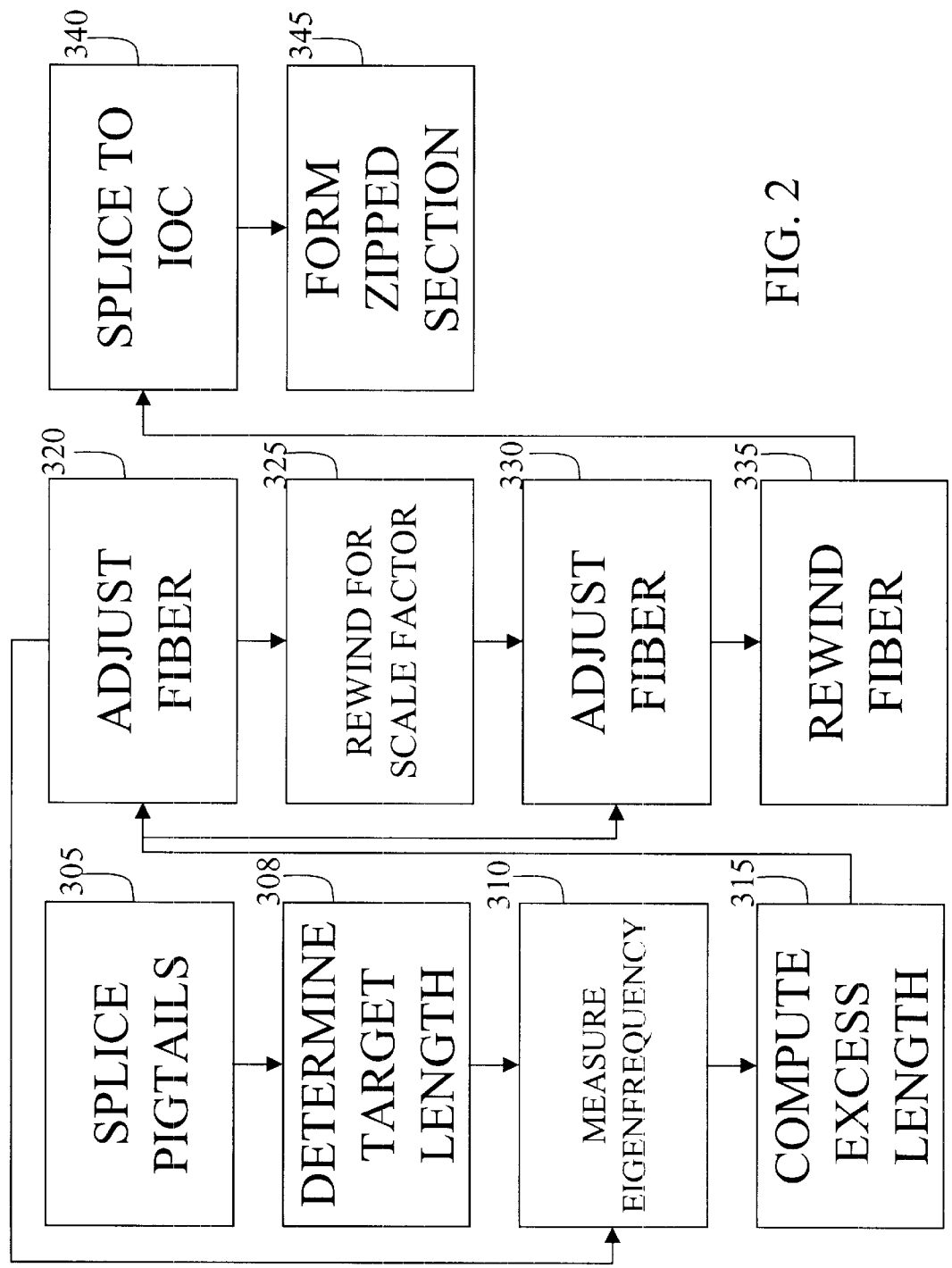
FIG. 2 is a flowchart for assembling a FOG with a particular eigenfrequency and scale factor.

FIG. 2 illustrates a method and system for manufacturing a FOG using the relationships provided herein to satisfy specified criteria with preassembled components. As FIG. 2 indicates, the pigtails or normal and reverse splices 145, 140 can be spliced 305 to the coil 155, and attached to the IOC 120. As indicated previously, in some embodiments, the coil 155 can include a premanufactured assembly with first and second leads 130, 135 extending therefrom.

After the pigtails 145, 140 are spliced or otherwise attached 305 to the coil 155, the eigenfrequency, $F_{measured}$, of the assembly can be measured 310 using procedures known to one of skill in the art. For example, optical time domain reflectometry (OTDR) can measure the round-trip time for light to travel the length of the coil/pigtail assembly as measured from either end of the dual channel IOC interface 176, 178, where the eigenfrequency can be inversely proportional to the time for light to traverse the fiber coil. Those with ordinary skill in the art will recognize that the methods and systems provided herein are not limited to the method for measuring eigenfrequency.

Once the eigenfrequency is measured 310, the excess length of the FOG can be determined 315. In one embodiment, $L_{excess}$ can be determined by measuring the length of the normal and reverse splices 145, 140 (e.g., $L_5$ and $L_6$, respectively) and adding these lengths to the manufacturer's reported coil length (i.e., $L_1+L_2+L_3+L_4$) to obtain $L_{Total}$. $L_{TGT}$ can also be computed 312 from the known or desired eigenfrequency using, for example, Equation (2).

$L_{excess}$ can thereafter be computed 308 using, for example, Equations (7), and (8) as provided herein. Those with ordinary skill in the art will recognize that the methods and systems are not limited by the process or method to compute $L_{excess}$, and $L_{excess}$ can be computed using other techniques without departing from the methods and systems.

Providing $L_{excess}$ is greater than zero, the total fiber length can be adjusted 320 by removing excess fiber from one or more length components that can be altered as previously provided herein, namely lengths $L_1$, $L_2$, $L_3$, $L_5$, and/or $L_6$. In one embodiment, the excess fiber can be removed in equivalent amounts from the normal and reverse fiber segments, such that approximately half of the excess can be removed from both segments. Those with ordinary skill in the art will recognize that the excess fiber can be removed from the splice sections 145, 140 and/or the lead sections 130, 135. Additionally, it can be understood that the normal and reverse lead and/or splice lengths can vary, and in some embodiments, it can be desirable to vary the fiber length in the respective splice and/or lead sections, possibly by approximately thirty centimeters, for example, for ease of fiber handling and identification of splice or lead.

Alternatively, if $L_{excess}$ is less than zero, fiber can be added 320 to achieve the desired total length. Accordingly, in one embodiment, fiber can be added between the splices 145, 140 and the leads 130, 135. In another embodiment, the splices 145, 140 can be removed and replaced with longer splices. In some embodiments, the coil 155 can be discarded and a new coil selected. The ability to add fiber can be dependent on the component fiber lengths $L_1$–$L_6$, the splice 145, 140 locations, and other particulars specific to the FOG and understood to one of ordinary skill in the art.

In some embodiments, a re-measurement of the eigenfrequency 310 and readjustment of the length 315 can be performed, one or more additional times, as necessary.

Once the fiber is adjusted 320, computations can be performed to determine how to wind the non-inner coil portions of the coil assembly to obtain the desired scale factor 325. Particularly, the non-inner coil portions of the coil assembly can be rewound to obtain a desired mean diameter of the coil assembly, $D_{Tgt}$. In one embodiment, the length $L_1$ can be selected to achieve a $L_{Plus}$ and $L_{Minus}$ that are appropriate for the desired scale factor per Equation (6), for example. This algebraic manipulation can provide a simultaneous solution for Equations (14) and (15) because of the relationship of $L_1$ to other component lengths. Specifically, as previously described herein, the location of reversal 150 affects $L_{Minus}$ and $L_{Plus}$ simultaneously as reversal 150 location affects the lengths of $L_1$ and $L_2$. Accordingly, the rewinding process can either increase or decrease the scale factor by altering the mean diameter, $D_{Tgt}$. Those with ordinary skill in the art will recognize that the length adjustments can be approximate, and the sum of the lengths for $L_{Minus}$ and $L_{Plus}$ may not be exactly as computed or otherwise provided in Equations (14 and 15).

Those with ordinary skill in the art will recognize that that there is typically a mean optical diameter range that can be associated with an eigenfrequency. Accordingly, there can be a maximum and minimum mean optical diameter, where optical mean diameters, D, within the range between minimum and maximum can be acceptable for the desired eigenfrequency.

Based upon the winding strategy 325, in some embodiments, the non-inner coil fiber can be rewound 335 onto the inner coil 157. The fiber forming the reversal 150 can also be wound and checked for kinks.

If the pigtails 145, 140 are not currently connected to the IOC 120 or the leads 130, 135, the pigtails 145, 140 can be spliced to the leads 130, 135 and the IOC 120, 340. The zipped section 125 can also be formed 345 as provided earlier herein, by securing the pigtails with, for example, epoxy. In one embodiment, the zipped section 125 can be twenty centimeters. In some embodiments, the zipped section 125 can be formed 345 before connecting to the IOC 120, 340.

In an embodiment, the reversal 150 can be adjusted after the rewinding 335 and/or the IOC connection 340 and/or creating the zipped section 345, as errors in the length of $L_1$ can be created by the rewinding process 335, 340, 345. Accordingly, the FOG can be tested for association with the desired eigenfrequency, and further adjustments can be made as provided herein, based on the test results.

One potential advantage of the methods and systems is that a desired eigenfrequency and/or scale factor can be achieved using the disclosed methods and systems.

What has thus been described is a method and system for winding optical fiber. In an embodiment, the method and system can be used to tune a fiber optic gyroscope (FOG) for a desired eigenfrequency and/or scale factor. A FOG assembly can include an inner coil that can have a normal and a reverse breakout point, a normal and a reverse lead emanating therefrom, and a normal and a reverse splice that can be connected at normal and reverse connection points. The coil can be wrapped to include a reversal where the reverse section of fiber changes direction in which it is wrapped on a spool. The fiber length can be adjusted based on the desired eigenfrequency. Furthermore, based on a scale factor, a forward (plus) and reverse (minus) fiber length can be computed and at least one of several lengths that can be defined by the ends of the normal and reverse splices, the normal and reverse connection points, the normal and reverse leads, the normal and reverse breakout points, and the reversal, can be adjusted to further attain the scale factor and/or eigenfrequency. The reversal location can be adjusted, and other lengths can similarly be adjusted based on the computed plus and minus fiber lengths. Some adjustments, measurements, and/or computations can be performed iteratively.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be implemented as a computer-readable storage medium, configured with a computer program, where the storage medium so configured causes a computer to operate in a specific and predefined manner.

Although the methods and systems have been described relative to a specific embodiment thereof, they are not so limited. Obviously many modifications and variations may become apparent in light of the above teachings. For example, as provided herein, although in some embodiments, the inner coil can be fixed and not rewound, in other embodiments, the inner coil may not be epoxied or otherwise fixed, and hence can be altered during the re-winding process to achieve a desired length and/or scale factor. Although the illustrated embodiments included winding the fiber optic coil around a spool, those with ordinary skill in the art will recognize that, for the purposes of the disclosed methods and systems, a spool can be understood to include any object of any shape that can support fiber optic windings.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for winding optical fiber to an eigenfrequency, the method comprising:
   providing, for the optical fiber, a normal end and a reverse end, a normal breakout point and a reverse breakout point, a normal lead and a reverse lead provided from the normal and reverse breakout points toward the normal and reverse fiber ends, and a normal and a reverse connection point for connecting a normal and a reverse splice to at least one of normal and reverse leads and normal and reverse ends,
   wrapping the optical fiber between the normal breakout point and the reverse breakout point, around a spool,
   wrapping the optical fiber from the normal and reverse breakout points, to the normal and reverse ends, around the spool, to cause a reversal of wrapping direction of at least one of the reverse splice, the reverse connection point, and the reverse lead,
   providing a first length between the reversal and the reverse breakout point,
   providing a second length between the reversal and the reverse connection point,
   providing a third length between the normal connection point and the normal breakout point,
   providing a fourth length between the normal breakout point and the reverse breakout point,
   providing a fifth length between the reverse end and the reverse connection point,
   providing a sixth length between the normal end and the normal connection point,
   adjusting at least one of the first length, second length, third length, fourth length, fifth length, and sixth length based on the eigenfrequency.

2. A method according to claim 1, further including computing a target length based on the eigenfrequency.

3. A method according to claim 1, further including iteratively, measuring the eigenfrequency, and, adjusting at least one of the first length, second length, third length, fourth length, fifth length, and sixth length.

4. A method according to claim 1, further including measuring the eigenfrequency.

5. A method according to claim 1, further including measuring the eigenfrequency using optical time domain reflectometry.

6. A method according to claim 1, further including determining an excess length of the optical fiber.

7. A method according to claim 1, further including determining an excess length of the optical fiber based on a target length and a measured eigenfrequency.

8. A method according to claim 1, further including determining a total length of the optical fiber based on the measured eigenfrequency.

9. A method according to claim 1, wherein adjusting further includes at least one of removing excess optical fiber and adding optical fiber.

10. A method according to claim 1, further including securing at least a section of the normal splice to at least a section of the reverse splice to form a zipped section.

11. A method according to claim 10, further including winding the zipped section around the spool to create a reversal.

12. A method according to claim 1, wherein adjusting further includes adjusting to provide a mean diameter of the optical fiber.

13. A method according to claim 1, further including providing a mean diameter of the optical fiber.

14. A method according to claim 1, wherein adjusting further includes adjusting based on a scale factor.

15. A method according to claim 1, wherein adjusting further includes:
    computing a plus length and a minus length based on at least one of the eigenfrequency, a measured eigenfrequency, a target length, a mean diameter of the fiber coil, and a outside diameter of the fiber coil, and,
    adjusting at least one of the first length, the second length, the third length, the fourth length, the fifth length, and the sixth length based on the plus length and the minus length.

16. A method according to claim 1, further including:
    providing the first length, the third length, and the sixth length as forward lengths, and
    providing the second length and the fifth length as reverse lengths.

17. A method according to claim 16, wherein adjusting further includes adjusting based on a sum of the forward lengths.

18. A method according to claim 16, wherein adjusting further includes adjusting based on a sum of the reverse lengths.

19. A method winding an optical fiber to an eigenfrequency, the method comprising:
    providing a plus length based on an excess length of fiber, the excess length further based on a total length, a measured eigenfrequency, and the eigenfrequency,
    providing a minus length based on the excess length,
    equating the plus length to a sum of at least one forward fiber length,
    equating the minus length to a sum of at least one reverse fiber length, and,
    adjusting at least one of,
    the at least one forward fiber length such that the sum of forward fiber lengths approximately equals the plus length, and,
    the at least one reverse fiber length such that the sum of reverse fiber lengths approximately equals the minus length.

20. A method according to claim 19, wherein at least one of providing a plus length and providing a minus length further includes providing an effective mean diameter of an incremental portion of fiber.

21. A method according to claim 19, wherein at least one of providing a plus length and providing a minus length further includes providing a desired mean outside diameter of the coiled fiber.

22. A method according to claim 19, wherein adjusting further includes adjusting based on an outside diameter of the coiled fiber.

23. A method according to claim 19, wherein at least one of providing a plus length and providing a minus length further includes providing a length of an inner coil.

24. A method according to claim 19, wherein at least one of providing a plus length and providing a minus length further includes providing a desired length of the fiber.

25. A method according to claim 19, wherein the optical fiber has a normal end and a reverse end, a normal breakout point and a reverse breakout point, a normal lead and a reverse lead provided from the normal and reverse breakout points toward the normal and reverse fiber ends, and a normal and a reverse connection point for connecting a normal and a reverse splice to at least one of normal and reverse leads and normal and reverse ends.

26. A method according to claim 25, further including,
securing at least a section of the normal splice to at least a section of the reverse splice to form a zipped section,
wrapping the optical fiber between the normal breakout point and the reverse breakout point, around a spool,
wrapping the optical fiber from the normal and reverse breakout points, to the normal and reverse ends of the zipped section, around the spool, to cause a reversal of wrapping direction of at least one of the reverse splice, the reverse connection point, and the reverse lead, and,
wherein adjusting the at least one forward fiber length further includes adjusting at least one of:
a first length between the reversal and the reverse breakout point,
a third length between the normal connection point and the normal breakout point, and,
providing a sixth length between the normal end and the normal connection point.

27. A method according to claim 25, further including:
securing at least a section of the normal splice to at least a section of the reverse splice to form a zipped section,
wrapping the optical fiber between the normal breakout point and the reverse breakout point, around a spool,
wrapping the optical fiber from the normal and reverse breakout points, to the normal and reverse ends of the zipped section, around the spool, to cause a reversal of wrapping direction of at least one of the reverse splice, the reverse connection point, and the reverse lead, and,
wherein adjusting the at least one reverse fiber length further includes adjusting at least one of:
a second length between the reversal and the reverse connection point, and,
a fifth length between the reverse end and the reverse connection point.

28. A method according to claim 25, wherein at least one of providing a plus length and providing a minus length further includes providing a fourth length between the normal breakout point and the reverse breakout point.

29. A method for wrapping optical fiber for a desired eigenfrequency where the optical fiber has a normal end and a reverse end, a normal breakout point and a reverse breakout point, a normal lead and a reverse lead provided from the normal and reverse breakout points toward the normal and reverse fiber ends, and a normal and a reverse connection point for connecting a normal and a reverse splice to at least one of normal and reverse leads and normal and reverse ends, the method comprising:
obtaining a measured eigenfrequency,
determining an excess length based on the measured eigenfrequency and the desired eigenfrequency,
adjusting at least one of the normal and reverse leads and the normal and reverse splices based on the excess length,
wrapping the optical fiber from the normal and reverse breakout points, to the normal and reverse ends, around a spool, to cause a reversal of wrapping direction of at least one of the reverse splice, the reverse connection point, and the reverse lead, and,
adjusting a location of the reversal based on the eigenfrequency.

30. A method according to claim 29, wherein adjusting a location of the reversal further includes adjusting at least one of a forward length and a reverse length of the optical fiber.

31. A method according to claim 29, wherein adjusting a location of the reversal further includes:
providing a plus length based on an excess length of fiber, the excess length further based on a total length, a measured eigenfrequency, and the eigenfrequency,
providing a minus length based on the excess length, equating the plus length to a sum of at least one forward fiber length,
equating the minus length to a sum of at least one reverse fiber length, and,
adjusting at least one of,
the at least one forward fiber length such that the sum of forward fiber lengths approximately equals the plus length, and,
the at least one reverse fiber length such that the sum of reverse fiber lengths approximately equals the minus length.

32. A method according to claim 29, wherein obtaining a measured eigenfrequency further includes using optical time domain reflectometry.

33. A method for winding optical fiber around a spool for an eigenfrequency and a scale factor, the method comprising,
providing a target length of the optical fiber,
providing a target diameter of the optical fiber winding,
providing a factor based on a product of an inner product length and an effective mean diameter of an incremental portion of the inner coil,
providing an excess fiber length,
providing a plus length based on the excess fiber length, the factor, the target diameter, and the target length,
providing a minus length based on the excess fiber length, the factor, the target diameter, and the target length,
equating at least one of the plus length and the minus length to a sum of lengths, and,
adjusting at least one of the sum of lengths to provide the determined plus length and minus length.

34. A method according to claim 33, further including providing an excess length, and wherein,
providing a plus length includes determining the plus length based on the excess length, and,
providing a minus length includes determining the minus length based on the excess length.

35. A method according to claim 33, wherein equating at least one of the plus length and the minus length to a sum of lengths further includes determining at least one of a sum of lengths in a forward direction and a sum of lengths in a reverse direction.

36. A method according to claim 33, wherein equating at least one of the plus length and the minus length to a sum of lengths further includes, provideing, for the optical fiber, a normal end and a reverse end, a normal breakout point and a reverse breakout point, a normal lead and a reverse lead provided from the normal and reverse breakout points toward the normal and reverse fiber ends, and a normal and a reverse connection point for connecting a normal and a reverse splice to at least one of normal and reverse leads and normal and reverse ends, providing a first length between the reversal and the reverse breakout point, providing a second length between the reversal and the reverse connection point, providing a third length between the normal connection point and the normal breakout point, providing a fifth length between the reverse end and the reverse connection point, providing a sixth length between the normal end and the normal connection point, and wherein, equating the plus length to a sum of lengths includes equating the plus length to a sum of the first length, the third length, and the sixth length, and, equating the minus length to a sum of lengths includes equating the minus length to a sum of the second length and the fifth length.

37. A method according to claim 33, wherein providing an excess fiber length includes expressing the excess fiber length based on a total length of the optical fiber, the eigenfrequency, and a measured eigenfrequency.

38. A method according to claim 33, wherein providing a target length of the optical fiber includes providing a target length of the optical fiber based on the eigenfrequency.

39. A method according to claim 33, wherein providing a target diameter of the optical fiber winding includes providing a target diameter of the optical fiber winding based on the scale factor.

* * * * *